J. A. PYKE.
DEVICE FOR AUTOMATICALLY DRAINING BILGE WATER AND OTHER REFUSE FROM BOATS WHILE IN MOTION.
APPLICATION FILED JUNE 11, 1909.

965,011.

Patented July 19, 1910.

Witnesses

Inventor

UNITED STATES PATENT OFFICE.

JOHN ARTHUR PYKE, OF BROCKVILLE, ONTARIO, CANADA, ASSIGNOR TO FRED H. BRIGHTMAN AND JOSEPH F. BRIGHTMAN, BOTH OF BROCKVILLE, ONTARIO, CANADA.

DEVICE FOR AUTOMATICALLY DRAINING BILGE-WATER AND OTHER REFUSE FROM BOATS WHILE IN MOTION.

965,011. Specification of Letters Patent. Patented July 19, 1910.

Application filed June 11, 1909. Serial No. 501,632.

*To all whom it may concern:*

Be it known that I, JOHN ARTHUR PYKE, of the city of Brockville, in the county of Leeds, in the Province of Ontario, Canada, having invented a certain new and useful Device for Automatically Draining Bilge-Water and other Refuse from Boats While in Motion, do hereby declare that the following is a full, clear, and exact description of the same.

My invention relates to improvements in a device for automatically discharging bilge water and other refuse from boats while in motion; and the objects of my invention are: first, to provide a means of automatically discharging bilge water and other refuse from a given level within a boat into water of a higher level without, while the boat is in motion; second, to provide a means for preventing the reëntrance of water while the boat is at rest.

Figure 1:
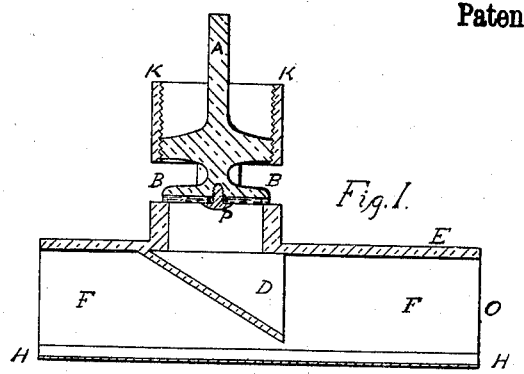
Figure 2:
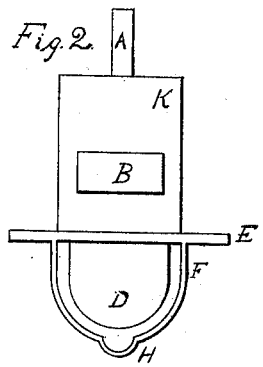
Figure 3:
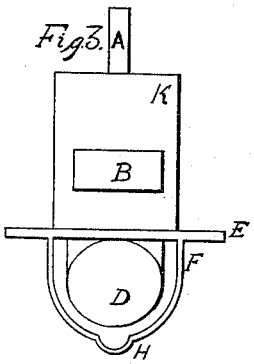
Figure 4:
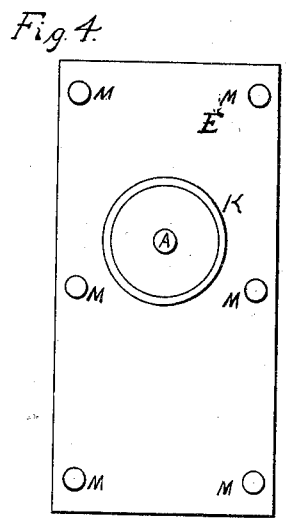
Figure 5:
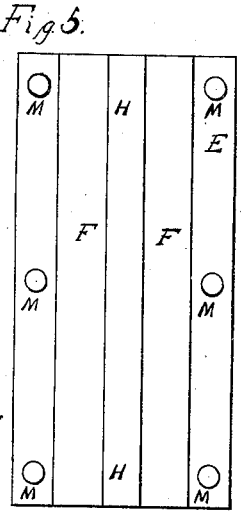

I attain these objects by the mechanism illustrated in the accompanying drawing, in which;

Figure 1 is a vertical, sectional view of the entire device; Fig. 2, a front view of the entire device; Fig. 3, a rear view; Fig. 4, a top view; Fig. 5, a bottom view.

Similar letters refer to similar parts throughout the several views.

K is valve sleeve, into which stem A is screwed.

B is intake opening, through which when stem A is raised and the boat is in motion, bilge water or other refuse is drawn by suction through slanting nipple D, escaping through tube F H at O.

H is groove or channel in bottom of tube F.

E is plate attached to bottom of boat by bolts at M.

What I claim as my invention, and desire to secure by Letters Patent, is:

The combination, in a device for automatically discharging bilge water and other refuse from boats while in motion, of a semicircular casing or tube with a groove or channel at the lower side, an intake portion extending upwardly through the bottom of the vessel and provided with a valve seat thereon, a valve for said seat, and a slanting nipple in the tube beneath the intake partially filling the tube, and adapted to create suction in passing through the water, all substantially as set forth.

Brockville, Ontario, Canada, June 9, 1909.

JOHN ARTHUR PYKE.

Signed in the presence of—
FREDERICK H. BRIGHTMAN,
A. J. REQUA.